Oct. 11, 1932.　　　　F. J. JARVIS　　　　1,882,498
TIRE TREAD
Filed Jan. 3, 1929
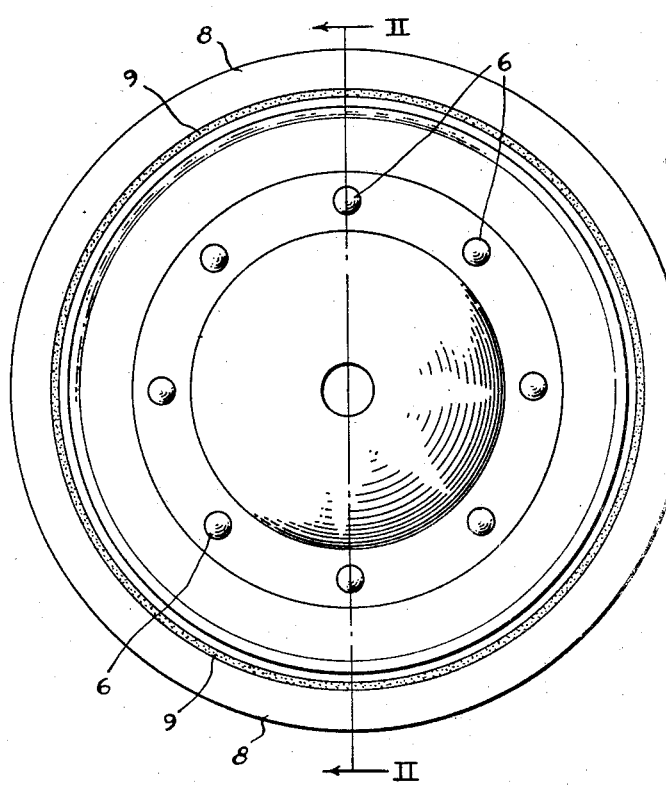
Fig. I.
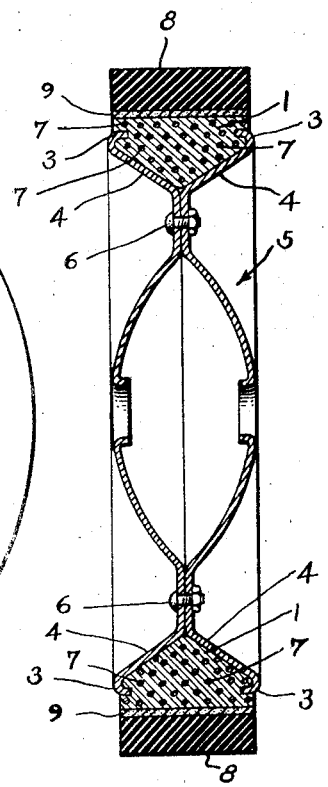
Fig. II.
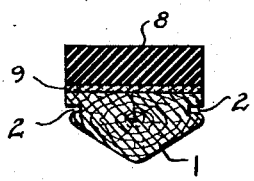
Fig. III.
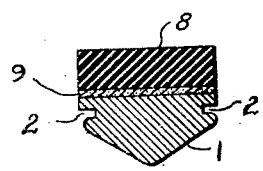
Fig. IV.
Inventor
Frank J. Jarvis.
By Harry H. Styll
Attorney Patented Oct. 11, 1932

1,882,498

UNITED STATES PATENT OFFICE

FRANK J. JARVIS, OF PALMER, MASSACHUSETTS, ASSIGNOR TO JARVIS & JARVIS, INC., OF PALMER, MASSACHUSETTS, A CORPORATION OF MASSACHUSETTS

TIRE TREAD

Application filed January 3, 1929. Serial No. 330,015.

This invention relates to improvements in tires and particularly to combination demountable tires for casters and wheels of similar description and to an improved process for making such tires.

The principal object of the invention is to provide an improved replaceable tire having a relatively thin cushion tread and a relatively rigid base or support to insure a minimum of traction friction and a maximum ease of replacement.

Another object of the invention is to provide an improved process for making a replaceable tire having a relatively thin cushion tread and relatively rigid support therefor.

Another object of the invention is to provide improved means for making a cushion tire of relatively small traction friction.

Another object of the invention is to provide an improved combination tire having a relatively thin cushion tread and a relatively rigid attaching base.

Another object of the invention is to provide a simple, efficient and inexpensive replaceable tire of low traction friction with a maximum of ease in installing and replacing.

Other objects and advantages of the invention will become apparent from the following description taken in connection with the accompanying drawing. It will be apparent that many changes in the arrangement of parts and details of construction and steps of the process may be made without departing from the spirit of the invention as expressed in the accompanying claim. I, therefore, do not wish to be limited to the exact arrangements shown and described as the preferred forms only have been shown by way of illustration.

Referring to the drawing:

Fig. I is a front view of a wheel with the invention in place thereon;

Fig. II is a cross section on line II—II of Fig. I;

Fig. III is a cross section of a modified form of the invention taken on line II—II of Fig. I; and Fig. IV is a view similar to Fig. III of another modification.

Previous to my invention rubber tires for double disk wheels have occupied the entire space from the bottom of the tire chamber between the disks to the outer periphery of the tire. This has made a relatively thick and heavy rubber tire embodying a large amount of compressibility which increased the traction friction considerably as heavy loads were applied making it hard to move the wheel over its traction contact. In some forms of application it caused the abandonment of a rubber tire entirely for other forms, but which forms did not possess the other desirable features of a rubber tire, such as the absorption of shocks, etc.

It is, therefore, the prime object of my invention to provide a tire that retains the advantages of a rubber tire and overcomes the disadvantages of high traction friction and which also may be easily replaceable.

Referring to the drawing wherein similar reference characters are used to denote corresponding parts throughout, I provide a tire base 1 having the recesses 2 to engage the projecting flanges 3 of the double disks 4 of a separable wheel member 5. The disks 4 are held together by the bolts 6 in the usual manner. The tire base 1 is relatively resilient or compressible as compared with the disks 4. The disks 4 are usually of metal. I may make my tire base 1 of hard rubber or composition as shown in Fig. IV, or of wood as shown in Fig. III, or of a composition or fiber as shown in Fig. II wherein is embodied cords or pieces of fibrous material 7. The tire base 1 must be compressible enough to be engaged and held tightly by the flanges 3 of the disks 4 so it will not slip. Around the outer periphery of the tire base 1 I place the thin rubber tire or band 8 of the usual soft rubber or resilient material. The resilient tire tread or band 8, being relatively thin, forms a minor part of the entire tire. The tire 8 is relatively resilient or compressible as regards the tire base 1. I vulcanize or cement or otherwise secure the tire 8 to the tire base 1 at 9 so that the parts 1 and 8 joined by the uniting medium 9 form a unitary replaceable tire element. To place a tire element on the wheel the flanges 3 of the disks 4 are placed in the grooves 2 of the tire base 1 and the disks bolted together by the bolts 6. To replace a worn tire it is necessary only to loosen the bolts 6, insert the new tire element between the disks 4 as described above and tighten the bolts 6. It is also apparent that if the tire 8 is secured to the tire base 1 by cementing or other similar means, it may be stripped off when worn and replaced with a new ring or tire tread.

This construction provides a thin compressible tire 8, whose traction friction is low, secured to a relatively rigid tire base 1 that is relatively compressible with respect to the disks 4 so that it may be tightly clamped and held in place, thus providing an easily replaced tire of low traction friction yet retaining all the desirable features of a soft tread.

From the foregoing description it will be be seen that I have provided simple, efficient and inexpensive means for obtaining all of the objects and advantages of the invention.

Having described my invention, I claim:

In a device of a character described, a relatively hard wheel center having a peripheral tire supporting portion and tire interengaging means thereon, a tire on said tire supporting portion having a hard annular tire base of a lower degree of hardness than said wheel center and surrounding said wheel center, said tire base having a V shaped inner surface in direct engagement with the tire supporting portion substantially throughout its surface area, said tire base also having substantially flat parallel side walls with diametrically opposed circular grooves therein interengaging with the tire interengaging means on the wheel center and preventing displacement of the V shaped inner surface from the tire supporting portion and having a substantially flat peripheral surface lying substantially parallel with the axis of the wheel center, and a separate relatively soft and resilient annular tire tread of substantially rectangular shape cross section having its inner broad surface secured to the substantially flat peripheral surface of the tire base and having its side walls lying substantially in the plane of the side walls of said tire base, the cross sectional area of the soft tire tread being less than the cross sectional area of the tire base.

FRANK J. JARVIS.